United States Patent
Dallet

[19]

[11] Patent Number: 6,155,584

[45] Date of Patent: Dec. 5, 2000

[54] MAN-PROPELLED VEHICLE, SUCH AS IN PARTICULAR A CYCLE

[76] Inventor: Etienne Dallet, Mounas, 32370 Manciet, France

[21] Appl. No.: 09/214,117

[22] PCT Filed: Jun. 28, 1996

[86] PCT No.: PCT/FR96/01005

§ 371 Date: Dec. 28, 1998

§ 102(e) Date: Dec. 28, 1998

[87] PCT Pub. No.: WO98/00332

PCT Pub. Date: Jan. 8, 1998

[51] Int. Cl.[7] ............................................. B62M 1/04
[52] U.S. Cl. ..................... 280/252; 280/251; 280/233; 280/234; 280/243; 280/288.1
[58] Field of Search ................... 280/252, 251, 280/243, 233, 234, 288.1

[56] References Cited

U.S. PATENT DOCUMENTS

| | | | |
|---|---|---|---|
| 3,760,905 | 9/1973 | Dower ........................................ | 185/2 |
| 4,052,912 | 10/1977 | Vukelic ..................................... | 74/512 |
| 4,639,007 | 1/1987 | Lawrence .................................. | 280/234 |
| 4,928,986 | 5/1990 | Carpenter ................................. | 280/234 |
| 5,280,936 | 1/1994 | Schmidlin ................................. | 280/234 |
| 5,690,346 | 11/1997 | Keskitalo .................................. | 280/234 |
| 5,915,710 | 6/1999 | Miller ....................................... | 280/252 |
| 5,979,922 | 11/1999 | Becker et al. ............................ | 280/252 |
| 6,000,707 | 12/1999 | Miller ....................................... | 280/288.1 |
| 6,007,083 | 12/1999 | Currie ....................................... | 280/252 |

FOREIGN PATENT DOCUMENTS

| | | |
|---|---|---|
| 432336 | 2/1939 | Belgium . |
| 0 069 932 | 1/1983 | European Pat. Off. . |
| 811916 | 4/1937 | France . |
| 2 728 532 | 6/1996 | France . |
| 44 15 611 | 12/1994 | Germany . |

*Primary Examiner*—Paul N. Dickson
*Assistant Examiner*—Deanna Draper
*Attorney, Agent, or Firm*—Young & Thompson

[57] ABSTRACT

A man-propelled vehicle includes a frame with a seat, two pedals, and two hand-operated handles, each linked with the frame by actuating devices capable of communicating to them an alternating translational motion. The actuating devices are coupled with unidirectional rotary transmission devices on a drive shaft by links adapted to drive in rotation the rotary transmission device when the pedals and operating handles are actuated.

10 Claims, 5 Drawing Sheets

MAN-PROPELLED VEHICLE, SUCH AS IN PARTICULAR A CYCLE

The invention relates to an engine, such as particularly a cycle, for human propulsion, comprising a longitudinal chassis provided, toward one of its ends, with a seat provided with a backrest and, toward its other opposite end, with a system of pedals adapted to be actuated by the feet by a user in seated position with the back supported by the backrest, said system of pedals being associated with transmission means connecting it to a drive shaft, adapted to translate the movement of this pedal system into a movement of rotation of said drive shaft.

Such engines, described particularly in the patents FR 811 916 and BE 432 336, as to cycles, have the advantage of offering the user a comfortable "semi-reclining" position, whilst requiring an effort similar to or even less than that of conventional cycles.

However, such cycles do not permit optimizing the output of the efforts exerted by the user because of the "dead points" inherent in their design, which correspond to positions of the pedals in which the force transmitted is reduced or even zero.

It is moreover to be noted, that at present, all the cycles on the market designed to be used in a sitting position are provided with a conventional pedal system generally disposed at the front of the engine. As in those mentioned above, and because of the design of the pedal system, these cycles have "dead points" which do not permit optimizing the output of the forces.

The present invention seeks to overcome all of the drawbacks cited above, and has for its principal object to provide an engine optimizing the output of the efforts exerted.

Another object is to provide an engine of simple design having moreover a small size.

Another object is to provide an engine which, because of its cycle design, can easily be provided with arrangements for the transport of all types of implements.

To this end, the invention provides an engine, such as particularly a cycle, comprising a longitudinal chassis provided, toward one of its ends, with a seat provided with a backrest and, toward its opposite end, with a system of pedals adapted to be actuated by the feet by a user in a seated position with the back maintained by the backrest, said pedal system being associated with transmission means connecting it to a drive shaft, adapted to transform the movement of this pedal system into a movement of rotation of said drive shaft, the pedal system comprising two pedals connected to the chassis by actuating means adapted to permit giving them an alternating movement of translation, the transmission means comprising, for each pedal, a rotatable member for unidirectional transmission associated with resilient return means, carried by the drive shaft and connected to the actuating means by a connection member adapted to drive in rotation said rotatable member and the drive shaft, upon displacement of said pedal in a direction away from this latter relative to the seat.

According to the invention, this engine is characterized in that it comprises two handles adapted to be actuated manually, connected to the chassis by actuating means adapted to permit giving them an alternating movement of translation, the actuating means of each handle being connected to a rotatable member for unidirectional transmission associated with resilient means and carried by the drive shaft, by a connection member adapted to drive in rotation said rotatable member and the drive shaft, upon displacement of said handle in a direction away from the seat.

In the first instance, such an engine permits using in an optimum manner the muscular power developed by the four extremities of the user. Thus, each extremity drives in alternating displacement in translation a pedal or a handle and actuates the associated transmission member which is actuated in a single direction of rotation. Thus, this engine permits obtaining a developed force which is very much greater than that obtained with present engines.

Moreover, there should be noted the simplicity of design of this engine, comprising a chassis, actuating means moveable relative to said chassis, and a unidirectional transmission member connected to each pedal and to each handle.

Finally, there is to be noted the total independence it between the action of the different members which permit wide liberty of use.

According to another characteristic of the invention, the actuating means comprise, for each pedal and each handle, a carriage mounted slidably along the chassis.

Moreover, the two carriages of each pair of carriages are preferably interconnected by a flexible connection element associated with a return member secured to the chassis, disposed so as to maintain taut said connection element in the positions of the carriages in which these latter are located symmetrically on opposite sides of the midpoint of their path.

Thus, the pushing force exerted by an extremity, a leg or an arm, during its extension, adds to the tractive force of another extremity, when this latter is bent in synchronization with the extension of the first extremity.

Moreover, according to a preferred embodiment, the engine comprises resilient end-of-course members disposed so as to serve as abutments to the carriages in the position of these latter farthest from the seat.

These resilient abutments have for their function to store up the power supplied muscularly at the end of extension of the extremities, power which will be a maximum and to restore the energy accumulated at the beginning of the return phase of the carriages which corresponds to a lesser applied muscle power.

Similarly, the engine comprises preferably resilient end-of-path members disposed so as to serve as abutments to the carriages in the position of these latter farthest from the seat.

Such resilient elements permit accumulating the tractive forces and restoring them to obtain a greater pressure. They can moreover be used in association with the resilient elements and the flexible connection elements mentioned above.

Moreover, again with the object of optimizing output, each rotatable unidirectional transmission member preferably has a substantially ovoidal shape, and is mounted eccentrically on the drive shaft such that the length of the lever between the axis of rotation of said drive shaft and the longitudinal axis of the force exerted on the carriage will be inversely proportional to the distance separating said carriage from the seat.

Thus, in the bent position of the extremities corresponding to the least developed force, the force to be supplied to carry out rotation of the rotatable members will be less than that to be supplied at the end of the extension in which the developed force is a maximum.

Moreover, in its application as a cycle, in which the engine according to the invention comprises conventionally at least one driven rear wheel provided with an axle having a free wheel connected by a chain to at least one plate secured to the drive shaft, and a front wheel provided with an axle mounted on a fork secured to a steering column, this engine comprises preferably two handles articulated respectively each to the upper end of one of the handlebars, so as to be able to pivot about a longitudinal axis, said handles being connected to a steering bar secured to a steering tube by means of connection elements adapted to effect the rotation of said steering bar and tube in a direction about a vertical axis.

Moreover, within the framework of this cycle application, the plate is preferably mounted on the drive shaft by means of a free wheel adapted to permit driving in rotation said drive shaft only when the engine is moving forward.

Other characteristics, objects and advantages of the invention will become apparent from the detailed description which follows, with reference to the accompanying drawings, which show by way of non-limiting examples two preferred embodiments. In these drawings, which form an integral part of the present invention:

FIG. 2a is a side view,

FIG. 2b is a detail on an enlarged scale, from FIG. 2a,

Figure 1:
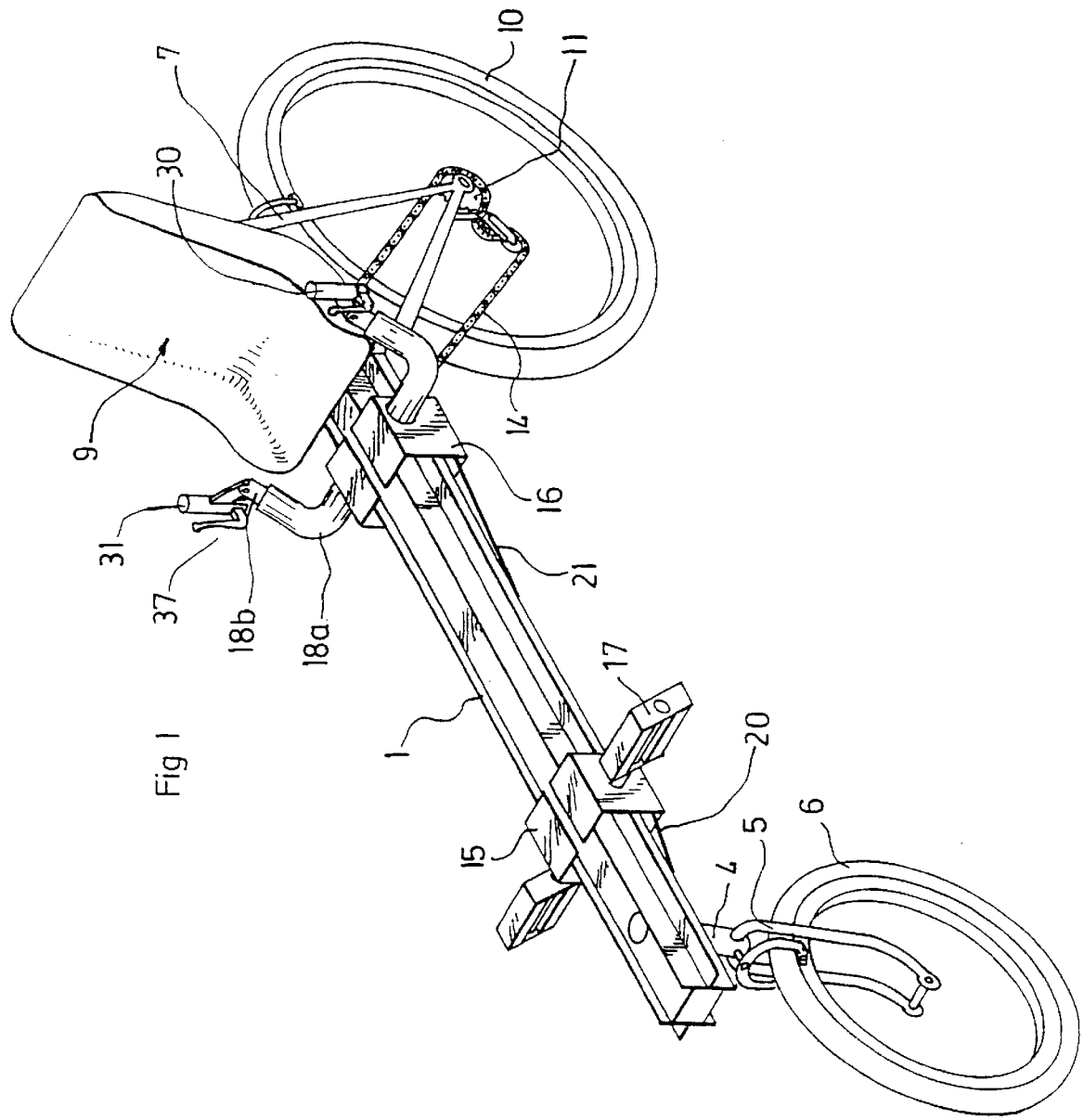
FIG. 1 is a perspective view of a cycle according to the invention.
Figure 2:
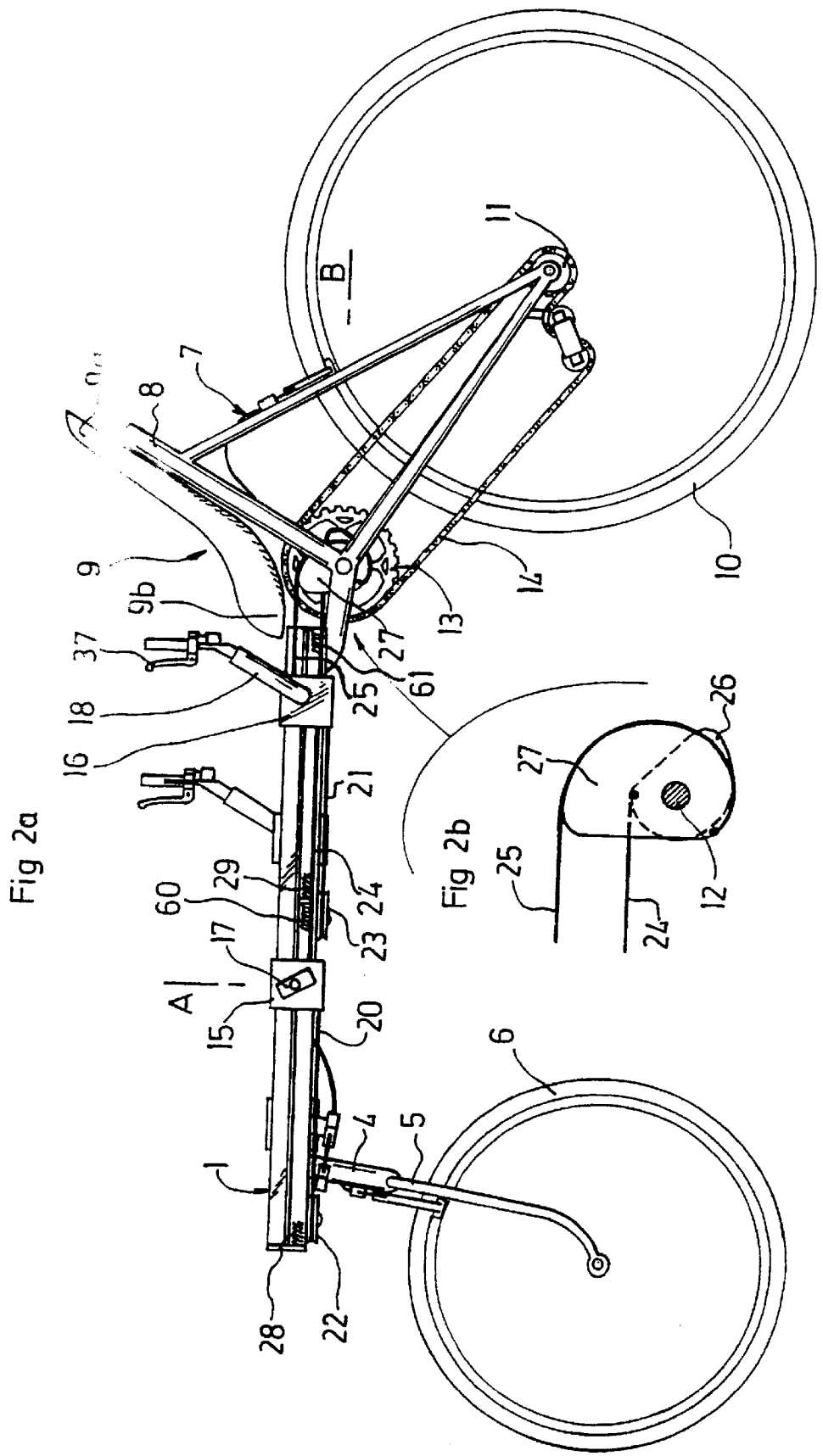
Figure 3:
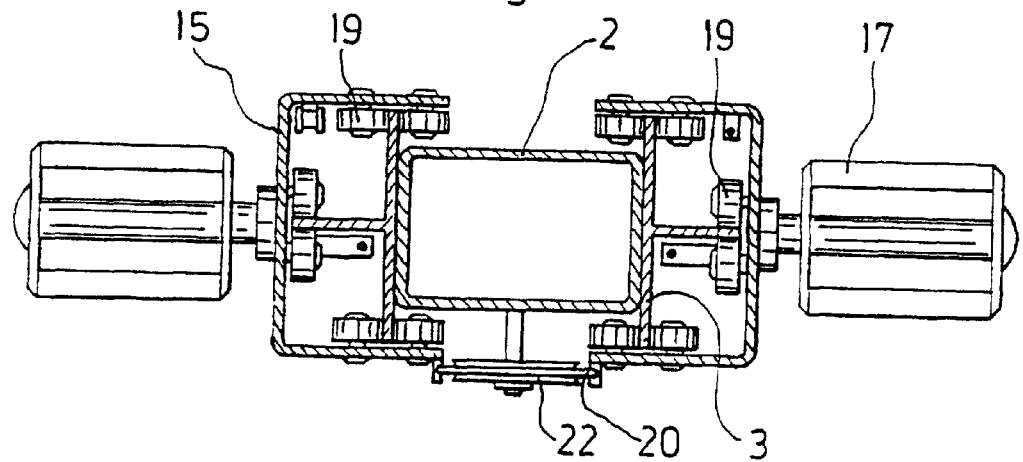
FIG. 3 is a transverse cross section in a vertical plane A, on an enlarged scale, showing the pedalcarrying carriages.
Figure 4:
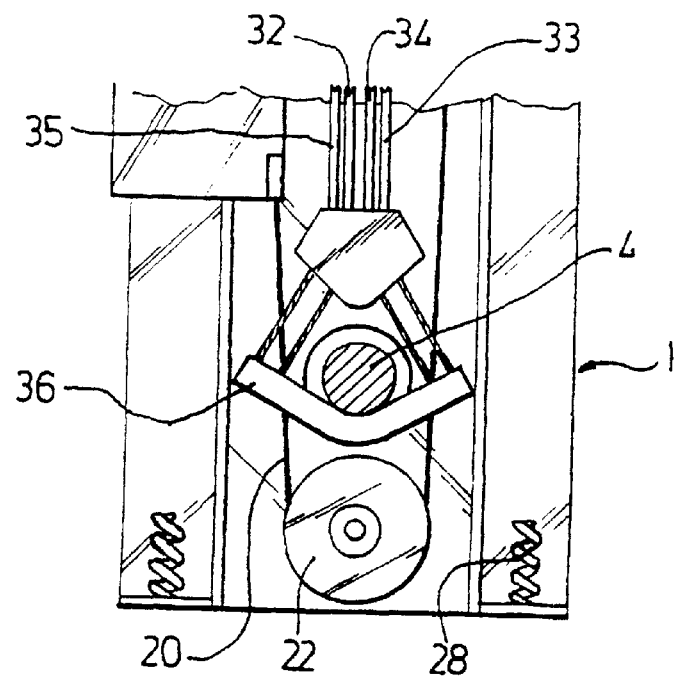
FIG. 4 is a fragmentary view from below of the chassis in line with the steering tube.

The cycles according to the invention shown by way of example in the figures are two-wheel cycles.

The cycle shown in FIGS. 1 to 6 comprises, in the first instance, a chassis 1 comprising a longitudinal guide rail, constituted by a tubular profile 2 of rectangular cross section, on each of the lateral surfaces of which are welded two profiles, such as 3, of T shaped arranged such that the stem of said T extends orthogonally relative to the corresponding side surface of the tubular profile 2.

This chassis 1 carries, toward its front end, a conventional steering column 4 in the prolongation of which extends a fork 5 supporting the axle of the front wheel 6.

Toward its rear end, the chassis 1 is prolonged by two tubular frames such as 7, parallel to each other, each having a generally triangular shape. One of the sides of these frames defines a support 8 for the backrest 9a of a seat 9 secured at the level of its seat 9b to the chassis 1, whilst the two other sides form two forks extending between said support 8 and the axle of the rear wheel 10 of which they support the shaft carrying the free wheel 11.

These two frames 7 are connected, at the level of their apices located substantially in the rearward prolongation of the chassis 1, by a shaft 12, a drive shaft, mounted in bearings, carrying the plate or plates such as 13 of said cycle conventionally connected to the free wheel 11 by a chain 14. Each plate 13 is moreover mounted on the drive shaft 12 by means of a free wheel adapted to permit the cycle to move backward.

Along the chassis 1 are mounted four identical carriage slideways such as 15, 16, associated two by two: two carriages 15 with foot actuation having each a pedal such as 17 and two carriages 16 for hand actuation having each a handlebar such as 18.

Each of these carriages 15, 16 is constituted by a profile of U shape adapted to overlie one of the profiles 3 of T shape of the chassis 1. Moreover, each carriage 15, 16 has three pairs of rollers such as 19 arranged to come into contact on opposite sides respectively of the stem and two wings of the profile 3 of the chassis, toward the end of said stem and wings.

Moreover, the carriages 15 (or 16) of each pair are connected by a cable 20 (or 21) associated with a return pulley 22 (or 23) with a vertical axis secured below the chassis 1, arranged such that any displacement of a carriage in one direction gives rise to the displacement of the associated carriage in the other direction.

Moreover, each of the carriages 15, 16 is connected by a cable such as 24, 25 of an adjustable length by any means known per se, to a pulley of ovoidal shape such as 26, 27 mounted about the drive shaft 12, each of said pulleys constituting a rotatable member for unidirectional transmission of the free wheel system type, and being associated with an integral return spring (not shown).

The operation of each of these ovoidal pulleys 26, 27 is to drive in rotation the drive shaft 12, upon displacement in the direction of the front wheel 6 of the associated carriage 15, 16. During return of the carriages 15, 16, these ovoidal pulleys 26, 27 are inoperative relative to the drive shaft 12 and undergo a simple rotation under the action of the associated return spring.

Moreover, as shown in FIG. 2b, these ovoidal pulleys 26, 27 are mounted eccentrically relative to the drive shaft 12 such that the lever arm between the axis of this shaft and the axis of the force tending to give rise to rotation of said pulleys, will be of a variable length, preferably decreasing with the advance of the carriages 15, 16.

Figure 6:
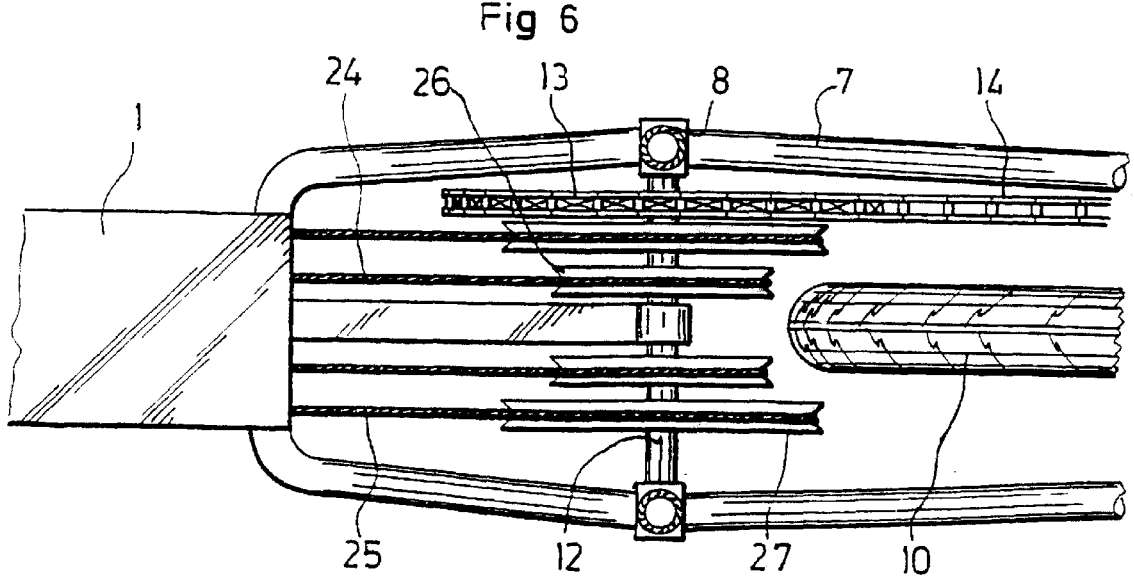
FIG. 6 is a longitudinal cross section in a horizontal plane B of the rear end of the chassis of the cycle.

Moreover, as shown in FIGS. 2b and 6, the ovoidal pulleys 26 associated with the carriages 15 that are foot actuated, are smaller than those 27 associated with the carriages 16 that are manually actuated.

Finally, as to carriages 15, 16, the chassis 1 carries resilient abutment members such as 28, 29 disposed so as to limit the forward path of said carriages and to exert on these latter a force tending to press them backward.

Similarly, the carriage 1 carries resilient abutment members such as 60, 61, disposed so as to limit the path toward the rear of the carriages 15, 16 and to exert on these latter a force tending to press them forwardly.

The longitudinal position of these resilient abutment members 28, 29, 60, 61 can moreover be adjusted as a function of the size of the user, particularly to limit the angle of rotation of the ovoidal pulleys 26, 27.

Moreover, the handlebars 18 have a telescopic structure and comprise a fixed section 18a constituted by an elbowed tube, and a movable section 18b adapted to permit adjusting the height of said handlebars relative to the chassis 1.

The movable section 18b of each of these handlebars 18 is moreover extended by a handle 30, 31 articulated about a longitudinal axis.

Each of these handles 30, 31 is secured to the end of two cables, respectively 32, 33 and 34, 35, fixed symmetrically on opposite sides of the axis of articulation. The opposite end of these cables 32–35 is itself secured to a horizontal steering bar 36 of V shape secured to the steering tube 4.

Figure 5:
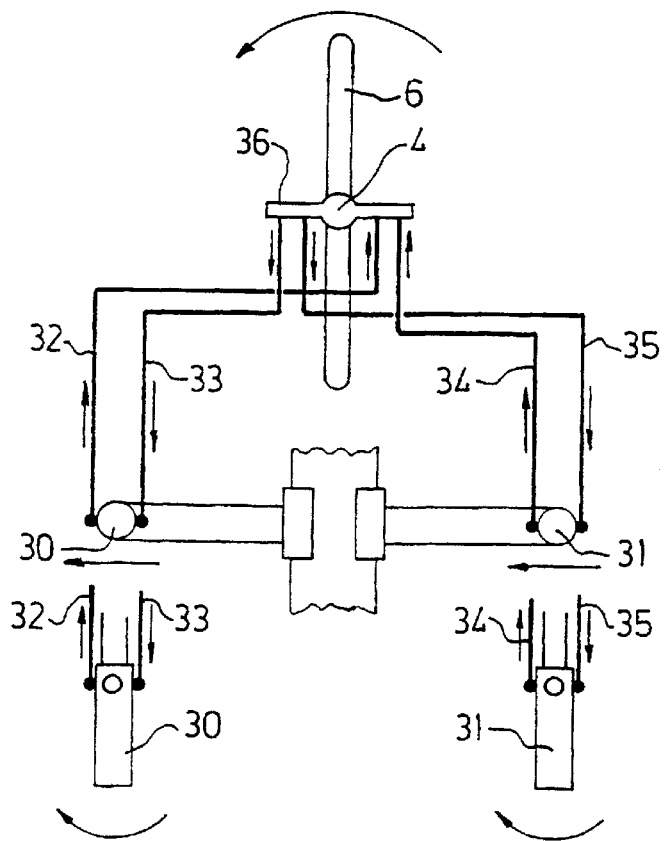
FIG. 5 is an operating diagram of the manipulating means of the steering tube.

As shown in FIG. 5, the cables 32–35 are arranged such that, during pivoting of a handle 30, 31, said cables cause the rotation of the steering bar 36 in one direction or the other.

Finally, and in a known manner, the handles 30, 31 are provided with brake handles such as 37 and members (not shown) for controlling the gear shift or gear shifts.

Figure 7:
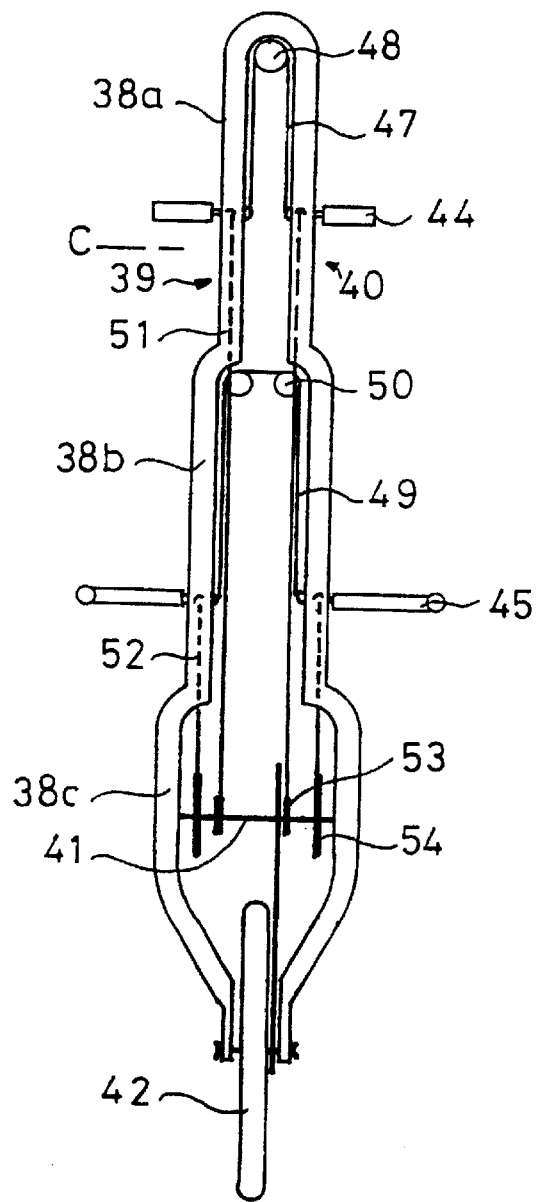
FIG. 7 is a schematic view from above of a modified embodiment of a cycle according to the invention, shown without its seat and without its front wheel.

FIG. 7 shows a modification according to which the chassis is constituted by a hollow cylindrical tube 38 bent so as to have the shape of a fork whose elbowed end of 180° constitutes the front end of the cycle.

The two limbs 39, 40 of this fork 38 are moreover shaped such that said fork has, longitudinally, three sections of different width: a front section 38a of minimum width along which the two limbs 39, 40 extend parallel to each other and substantially horizontally, an intermediate section 38b of greater width than that of the front section 38a, along which the limbs 39, 40 extend also parallel to each other and substantially horizontally, and a rear section 38c of maximum width along which the limbs 39, 40 have a first portion of a length in which they extend parallel and where the drive shaft 41 is located, and a second portion of a length in which they converge toward each other so as to carry, toward their end, the shaft carrying the free wheel of the rear wheel 42.

Moreover, this rear section 38c which constitutes the rear portion of the cycle carrying particularly the seat, is inclined downwardly relative to the front and intermediate sections 38a and 38b.

Figure 8:
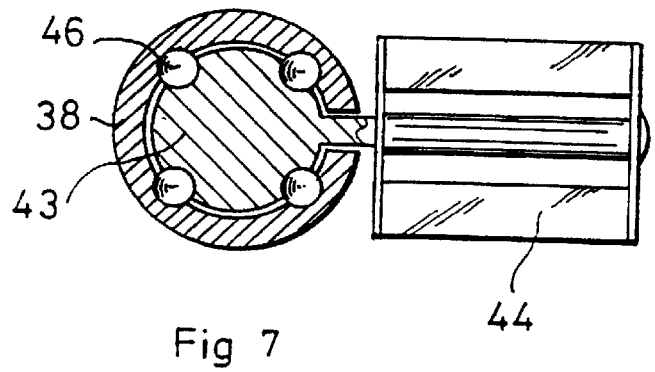
FIG. 8 is a transverse cross sectional view on the vertical plane C, on an enlarged scale of the chassis of this modified cycle.

As shown in FIG. 8, each carriage 43 is constituted by a cylindrical carriage disposed within the tube 38 of the chassis, provided with a securement tongue for the pedal 44 or of the handlebar 45, extending through a longitudinal slot provided in this tube.

Moreover, these carriages 43 and the tube 38 are provided with facing longitudinal channels receiving ball bearings 46.

As shown in FIG. 7, the pedal-carrying carriages 44 are disposed so as to slide along the front section 38a of the chassis and are connected by a cable 47 associated with a return pulley 48 with a vertical axis mounted toward the front end of said chassis.

The handlebar-carrying carriages 45 are themselves disposed slidably along the intermediate section 38b of the chassis and are connected by a cable 49 associated with two return pulleys such as 50 mounted toward the front end of said intermediate section.

Finally, as in the first embodiment, these carriages 43 are connected by cables such as 51, 52 to ovoidal pulleys such as 53, 54 carried by the drive shaft 41.

It is moreover to be noted, that the tube 38 can have a rounded form other than circular, and that the carriages 43 can be slidably mounted about this tube and not within this latter. Moreover, the sliding can be ensured, instead of with ball bearings 46, by a Teflon/Teflon (trademark) contact, or an iron/bronze lubricated contact.

As is seen from the figures, such cycles have the advantage of having small size. Moreover, because of their design, on the one hand, all the cables are integrated in the plane of the chassis and, on the other hand, a large volume is available above this chassis permitting the carrying of large loads.

Moreover, such cycles can be provided with any conventional accessories such as a cowling.

What is claimed is:

1. A cycle, comprising:
a longitudinal chassis provided, toward one end, with a seat provided with a backrest and, toward an opposite end, with a system of independent pedals adapted to be actuated with the legs of a user in a seated position with the user's back supported by the backrest, said pedal system being associated with transmission means connecting said pedal system to a drive shaft, adapted to transform the movement of said pedal system into a movement of rotation about said drive shaft,
said pedal system comprising two pedals connected to said chassis by first actuating means for giving said pedals an alternating movement of translation, said transmission means comprising, for each of said pedals, a first rotatable unidirectional transmission member associated with first resilient return means, carried by said drive shaft and connected to said first actuating means by a connection element adapted to drive in rotation said rotatable member and said drive shaft, upon displacement of said pedals in a direction away from said seat;
at least one rear driven wheel provided with an axle having a free wheel connected by a chain to at least one plate secured to said drive shaft, and a front wheel provided with an axle mounted on a fork secured to a steering column;
two independent handlebars adapted to be actuated manually, connected to said chassis by second actuating means adapted to permit giving said handlebars an alternating movement of translation, said second actuating means of each of said handlebars being connected to a second rotatable unidirectional transmission element associated with second resilient return means and carried by said drive shaft, by a connection element adapted to drive in rotation said rotatable member and said drive shaft, upon displacements of said handlebar in a direction away from the seat,
two handles articulated each respectively toward the upper end of the handlebars, so as to be able to pivot about a longitudinal axis, said handles being connected to a manipulating bar secured to said steering column by means of connection elements adapted to cause the rotation of said manipulating bar and said steering column about a vertical axis,
said first and second actuating means comprising, for each of said pedals and each of said handlebars, a carriage mounted slidably along said chassis,
resilient end-of-path elements disposed so as to serve as abutments for said carriages in a position nearest said seat,
wherein each of said first and second rotatable unidirectional transmission members has a substantially ovoidal shape, and is mounted eccentrically on said drive shaft such that the length of the lever arm between the axis of rotation of said drive shaft and the longitudinal axis of the force exerted on the respective one of said first and second activating means will be inversely proportional to the distance separating the respective ones of said pedals and said handlebars from the seat.

2. The cycle according to claim 1, wherein each pair of said carriages are interconnected by a flexible connection element associated with a return element secured to said chassis, disposed so as to maintain taut said connection element in the positions of said carriages in which these latter are located symmetrically on opposite sides of the midpoint of their path.

3. The cycle according to claim 1, wherein each of said rotatable unidirectional transmission members comprises a pulley of ovoidal shape connected to the respective said actuating means by a cable.

4. The cycle according to claim 1, wherein said at least one plate is mounted on said drive shaft by means of a free wheel adapted to permit driving in rotation said drive shaft only when the cycle moves forwardly.

5. A cycle, comprising:

a longitudinal chassis provided, toward one end, with a seat provided with a backrest and, toward an opposite end, with a system of independent pedals adapted to be actuated with the legs of a user in a seated position with the user's back supported by the backrest, said pedal system being associated with transmission means connecting said pedal system to a drive shaft, adapted to transform the movement of said pedal system into a movement of rotation about said drive shaft, said pedal system comprising two pedals connected to said chassis by first actuating means for giving said pedals an alternating movement of translation, said transmission means comprising, for each of said pedals, a first rotatable unidirectional transmission member associated with first resilient return means, carried by said drive shaft and connected to said first actuating means by a connection element adapted to drive in rotation said rotatable member and said drive shaft, upon displacement of said pedals in a direction away from said seat;

at least one rear driven wheel provided with an axle having a free wheel connected by a chain to at least one plate secured to said drive shaft, and a front wheel provided with an axle mounted on a fork secured to a steering column;

two independent handlebars adapted to be actuated manually, connected to said chassis by second actuating means adapted to permit giving said handlebars an alternating movement of translation, said second actuating means of each of said handlebars being connected to a second rotatable unidirectional transmission element associated with second resilient return means and carried by said drive shaft, by a connection element adapted to drive in rotation said rotatable member and said drive shaft, upon displacements of said handlebar in a direction away from the seat, two handles articulated each respectively toward the upper end of the handlebars, so as to be able to pivot about a longitudinal axis, said handles being connected to a manipulating bar secured to said steering column by means of connection elements adapted to cause the rotation of said manipulating bar and said steering column about a vertical axis, wherein each of said first and second rotatable unidirectional transmission members has a substantially ovoidal shape, and is mounted eccentrically on said drive shaft such that the length of the lever arm between the axis of rotation of said drive shaft and the longitudinal axis of the force exerted on the respective one of said first and second actuating means will be inversely proportional to the distance separating the respective ones of said pedals and said handlebars from the seat.

6. The cycle according to claim 5, said first and second actuating means comprising, for each of said pedals and each of said handlebars, a carriage mounted slidably along said chassis, further comprising resilient end-of-path elements disposed so as to serve as an abutment for said carriage in a position farthest from said seat.

7. A cycle, comprising:

a longitudinal chassis provided, toward one end, with a seat provided with a backrest and, toward an opposite end, with a system of independent pedals adapted to be actuated with the legs of a user in a seated position with the user's back supported by the backrest, said pedal system being associated with transmission means connecting said pedal system to a drive shaft, adapted to transform the movement of said pedal system into a movement of rotation about said drive shaft, said pedal system comprising two pedals connected to said chassis by first actuating means for giving said pedals an alternating movement of translation, said transmission means comprising, for each of said pedals, a first rotatable unidirectional transmission member associated with first resilient return means, carried by said drive shaft and connected to said first actuating means by a connection element adapted to drive in rotation said rotatable member and said drive shaft, upon displacement of said pedals in a direction away from said seat;

at least one rear driven wheel provided with an axle having a free wheel connected by a chain to at least one plate secured to said drive shaft, and a front wheel provided with an axle mounted on a fork secured to a steering column;

two independent handlebars adapted to be actuated manually, connected to said chassis by second actuating means adapted to permit giving said handlebars an alternating movement of translation, said second actuating means of each of said handlebars being connected to a second rotatable unidirectional transmission element associated with second resilient return means and carried by said drive shaft, by a connection element adapted to drive in rotation said rotatable member and said drive shaft, upon displacements of said handlebar in a direction away from the seat; and two handles articulated each respectively toward the upper end of the handlebars, so as to be able to pivot about a longitudinal axis, said handles being connected to a manipulating bar secured to said steering column by means of connection elements adapted to cause the rotation of said manipulating bar and said steering column about a vertical axis, said first and second actuating means comprising, for each of said pedals and each of said handlebars, a carriage mounted slidably along said chassis, wherein each pair of said carriages are interconnected by a flexible connection element associated with a return element secured to said chassis, disposed so as to maintain taut said connection element in the positions of said carriages in which these latter are located symmetrically on opposite sides of the midpoint of their path.

8. The cycle according to claim 7, further comprising resilient end-of-path elements disposed so as to serve as abutments for said carriage in a position nearest said seat.

9. The cycle of claim 7, wherein each of said first and second rotatable unidirectional transmission members has a substantially ovoidal shape, and is mounted eccentrically on said drive shaft such that the length of the lever arm between the axis of rotation of said drive shaft and the longitudinal axis of the force exerted on the respective one of said first and second actuating means will be inversely proportional to the distance separating the respective one of said pedals and said handlebars from the seat.

10. The cycle according to claim 9, wherein each of said rotatable unidirectional transmission members comprises a pulley of ovoidal shape connected to the respective said actuating means by a cable.

* * * * *